W. H. REINICKER
NUT LOCK.
APPLICATION FILED JUNE 10, 1916.

1,261,616. Patented Apr. 2, 1918.

INVENTOR
William H. Reinicker
BY
ATTORNEY

WITNESSES

UNITED STATES PATENT OFFICE.

WILLIAM H. REINICKER, OF YEDDO, INDIANA.

NUT-LOCK.

1,261,616.  Specification of Letters Patent.  Patented Apr. 2, 1918.

Application filed June 10, 1916. Serial No. 102,959.

*To all whom it may concern:*

Be it known that I, WILLIAM H. REINICKER, a citizen of the United States, residing at Yeddo, in the county of Fountain and State of Indiana, have invented certain new and useful Improvements in Nut-Locks, of which the following is a specification.

My invention relates to a nut lock.

While the invention aims to generally improve, simplify and render an article of this nature more efficient and still maintain the cost of manufacture at a low figure, yet I particularly aim to provide an article of this nature comprising a washer anchored by a nut and bolt, a locking washer engaging the nut and first washer, and means on the first washer to detachably hold the second washer, and further to provide a second washer with notches in which the locking means of the first washer is disposed to prevent relative movement, and to provide a device of the construction hereinafter set forth possessing the additional objects and advantages to be pointed out in relation thereto as the description progresses, and which is to be taken in connection with accompanying drawings illustrating one preferred embodiment.

In said drawings:—

Figure 1:
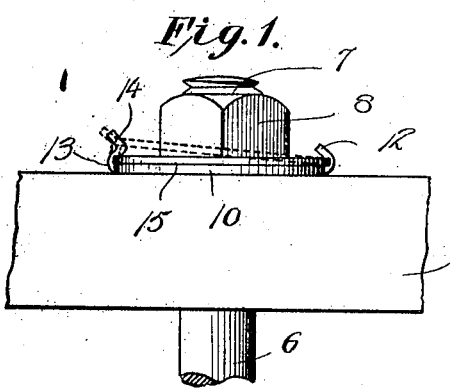
Figure 1 is a fragmentary side elevation showing my improvements in connection with a bolt, nut and work.

Referring specifically to the drawings wherein like reference characters designate like or similar parts, a bolt shank is shown at 6 having screw threads at 7 on which a nut 8 rides as usual. The bolt extends through suitable work 9 of wood, metal or any material in connection with which the bolt is used.

Figure 2:
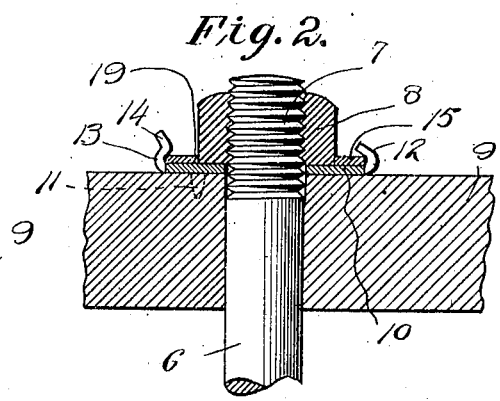
Fig. 2 is a vertical sectional view through the parts of Fig. 1.
Figure 3:
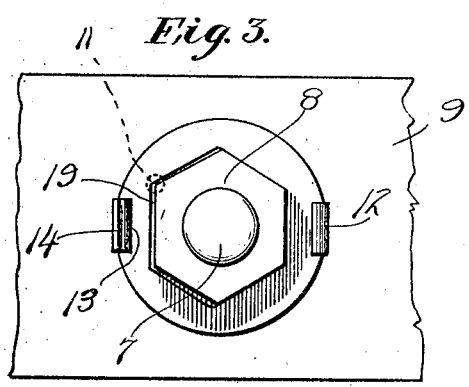
Fig. 3 is a top or plan view of the parts of Fig. 1.
Figure 4:
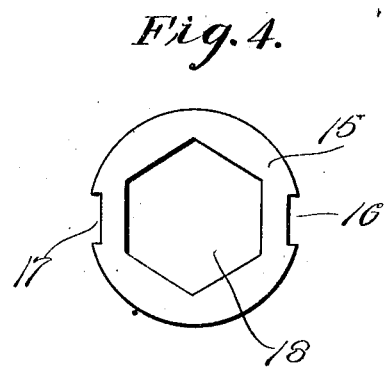
Fig. 4 is a plan view of the locking washer.
Figure 5:
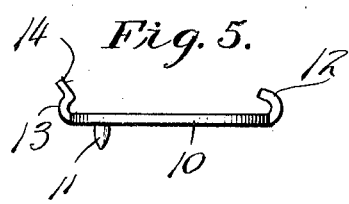
Fig. 5 is a side elevation of the anchoring washer.

An anchor washer or plate 10 is provided having an opening through which the bolt shank 6 extends and which washer or plate when clamped in position by the nut 8 which directly bears on it is shown in Fig. 2. When the anchor 10 is clamped in place by the nut 8, there is little likelihood of the anchor or plate 10 turning relatively to the bolt but as a safeguard, a lug 11 is provided which is adapted to penetrate the work 9. A hook shaped lug 12 is provided at one edge of the plate 12 and a fastening lug 13 is provided at diametrically opposite points on the edge of the plate 10 and at its lower portion is hook shaped while at the top slants outwardly and upwardly at the inclined portion 14.

A locking member is also employed which is in the shape of a washer or plate 15 having recesses 16 and 17 at diametrically opposite points of its outer edge to receive the lugs 12 and 13 and having a central opening 18 substantially conforming to the shape of the nut 8 in cross section and being slightly enlarged as at 19, so that it may be applied while in an inclined position as suggested in dotted lines in Fig. 1.

It should be mentioned that the lug 12 and especially the lug 13 are resilient and capable of outward movement to facilitate engagement with the locking plate.

In use, after the anchor 10 has been positioned and the nut 8 tightened, the locking plate 15 is placed over the nut in the dotted line position of Fig. 1, thereby being at an angle to the anchor plate. The recess 16 receives the hook 12 which overlaps the plate adjacent said recess. The portion of the plate at recess 17 first engages the inclined lug 14. After the hook 12 engages the locking plate, the plate is depressed adjacent the recess 17 so as to force the lug 14 outwardly and then fasten the same so that the lug 13 will clip into engagement therewith. As previously stated, the opening 18 is slightly enlarged to facilitate attachment of the locking plate as described. After the locking plate has been fastened, it may be removed if desired, by inserting a pry tool intermediate the locking plate and anchor plate and moving the locking plate to the dotted line position of Fig. 1 after which it can be readily removed.

It is to be understood that I do not limit the invention to use in connection with any particular shape of nut since the opening 18 may be varied, according to the shape of the nut. Also other changes may be resorted to within the spirit and scope of the invention.

I claim:—

1. A locking device for a nut including an anchor plate, a locking plate for the nut, said locking plate having an opening in which the nut is disposed, said opening being enlarged relatively to the nut so that the locking plate may be inclined for application and removal, and a resilient fastening lug for said locking plate with which the locking plate initially engages and while inclined and against which it is pressed so that the locking plate will be substantially flat against the anchor plate and the fastening lug will spring into locking engagement therewith.

2. A locking device for a nut including an anchor plate, a locking plate for the nut having an opening in which the nut is disposed, said opening being enlarged relatively to the nut so that the locking plate may be included for application and removal, a hooked lug integral with the anchor plate, a resilient fastening lug integral with the anchor plate with which the locking plate initially engages, and said locking plate having a recess receiving one of said lugs to prevent relative turning of the plates and maintain a wall at the opening of the locking plate in contact with the nut to prevent turning of the nut relative to the locking plate.

3. A locking device for a nut including an anchor plate having a first lug and a fastening lug, a locking plate having an opening in which the nut is disposed, said opening being enlarged relatively to the nut to permit tilting of the locking plate for application and removal, and said plate being applied to the nut while inclined and initially abutting the first lug and secondly engaging the fastening lug and being pressed substantially flat against the anchor plate.

4. A locking device for a nut including an anchor plate having a yieldable lug thereon, a locking plate capable of assuming an inclined position, said locking plate having a portion of substantially the same width as the space between the base of the lug and the nut, and said portion initially engaging the lug while inclined and being pressed flat against the anchor plate and snugly intermediate the nut and lug so as to be held in place by the spring action of the lug.

In testimony whereof I affix my signature in presence of two witnesses.

WILLIAM H. REINICKER.

Witnesses:
J. E. PALMER,
H. A. SOWERS.